United States Patent [19]

Sato et al.

[11] Patent Number: 5,100,857

[45] Date of Patent: * Mar. 31, 1992

[54] CATALYST FOR STEAM REFORMING

[75] Inventors: Nobuhiro Sato, Aichi; Kozo Ohsaki, Chiba; Katsutoshi Kikuchi, Chiba; Yoshitsugu Hirota, Chiba; Toru Numaguchi, Chiba; Noboru Mochiduki, Chiba, all of Japan

[73] Assignee: Toyo Engineering Corporation, Tokyo, Japan

[*] Notice: The portion of the term of this patent subsequent to Feb. 5, 2008 has been disclaimed.

[21] Appl. No.: 620,489

[22] Filed: Nov. 29, 1990

Related U.S. Application Data

[63] Continuation-in-part of Ser. No. 345,430, Apr. 28, 1989, Pat. No. 4,990,481.

[30] Foreign Application Priority Data

May 20, 1988 [JP] Japan ................................. 63-123221
Apr. 10, 1989 [JP] Japan ..................................... 1-89993

[51] Int. Cl.⁵ .......................... B01J 21/04; B01J 23/74
[52] U.S. Cl. ...................................... 502/335; 502/524
[58] Field of Search ................................ 502/335, 524

[56] References Cited

U.S. PATENT DOCUMENTS

| | | | |
|---|---|---|---|
| 3,759,678 | 9/1973 | Chamberland et al. | 502/335 X |
| 4,216,123 | 8/1980 | Banks et al. | 502/335 |
| 4,285,837 | 8/1981 | Sato et al. | 502/335 |
| 4,456,703 | 6/1984 | Aldridge | 502/524 |

Primary Examiner—W. J. Shine
Attorney, Agent, or Firm—Flynn, Thiel, Boutell & Tanis

[57] ABSTRACT

A catalyst for steam reforming of a hydrocarbon carrying from three to twenty weight percent of nickel as nickel oxide, which is made by immersing alumina particles in a nickel containing solution, drying and then calcining the particles, which alumina particles are of a α-alumina and of 98 weight percent or more purity and has a pore volume of the pores having a diameter of from 0.1 to 0.5 microns of 0.2 ml/g or more and pore volume of the pores having a diameter of more than 0.5 microns but not more than 10 microns of 0.05 ml/g or more.

2 Claims, No Drawings

CATALYST FOR STEAM REFORMING

This application is a continuation-in-part of U.S. Ser. No. 07/345 430, filed Apr. 28, 1989, now U.S. Pat. No. 4,990,481.

FIELD OF INDUSTRIAL UTILIZATION

This invention relates to a catalyst that is employed in the steam reforming of hydrocarbons or the like with steam to produce a gas mixture comprising hydrogen and carbon monoxide.

PRIOR ART

It has been previously known that a catalyst comprising a heat-resisting carrier of aluminum oxide, silica, etc., and a catalytically active component of nickel can be employed for reforming hydrocarbons or the like with steam. However, a catalyst of that kind has a drawback in that it has a low activity due to its higher diffusion resistance to the reactant into the fine pores of the catalyst and, in addition, it tends to encourage carbon deposition which results in the deactivation of the catalyst.

SUMMARY OF THE INVENTION

U.S. patent application Ser. No. 07/345 430 now U.S. Pat. No. 4,990,481, discloses a catalyst for steam reforming hydrocarbons in which nickel oxide catalyst is carried on a porous body of an alumina mainly comprising α-(alpha-)alumina.

The inventors have further studied this series of catalysts in the production of a gas mainly comprising hydrogen and carbon monoxide.

In this study, a plurality of catalysts were made by varying the characteristics of a porous body of an alumina, and the catalytic activities of them were precisely compared in a series of experiments. The variation in the characteristics of the porous body was attained by varying the temperature at which the porous alumina (porous bodies of active alumina) were fired.

As a result of the study, the inventors have found that a catalyst as described below shows excellent results in the steam reforming of hydrocarbons or the like for the purpose of the present invention.

In the catalyst of the present invention, nickel, as the active species (or ingredient) is carried in an amount, based on the total amount by weight of the catalyst, of from 3 to 20%, preferably from 5 to 15%, more preferably from 5 to 10% in weight calculated as nickel oxide, on a porous body of a highly pure aluminum oxide which is an α-(alpha-)alumina obtained by the heat treatment of boehmite alumina as a starting material via γ-(gamma)alumina and δ-(delta-)alumina, and is a porous structured body with (1) an apparent porosity of from 50 to 80%, preferably 50 to 70%, (2) a pore volume of pores having a pore diameter ranging from 0.1 to 0.5 microns of not less than 0.2 ml/g, (3) a pore volume of pores having a pore diameter of more than 0.5 microns but not more than 10 microns is not less than 0.05 ml/g and (4) a purity of not less than 98% by weight.

The invention provides a process for steam-reforming a hydrocarbon or a mixture of hydrocarbons into a reaction mixture including hydrogen gas and carbon monoxide in the presence of the catalyst as defined above.

Incidentally, though the conversion temperature to α-(alpha-)alumina has been said to be about from 1,150° to 1,200° C., the heat treatment (firing) temperature adopted to make the catalyst carrier in the later appearing examples was 1,300° C.±about 40° C.

This heat treatment may be performed preferably at a temperature from 1,200 to 1,380° C., and more preferably, from 1,250 to 1,350° C. In general, a greater number of the finer pores and larger surface area of the catalyst carrier are obtained when the heat treatment temperature is lower than this range, and a smaller number of the finer pores and smaller surface area of the carrier are obtained when this temperature is higher than this range. Both cases result in making it difficult to make a catalyst carrier suitable for the present invention.

The heat treatment for the conversion to α-alumina is accomplished under an oxidative (or oxidizing) atmosphere represented by air.

The conversion treatment is performed for a sufficient time, generally from three to five hours, preferably from two to four hours, with appropriate temperature-raising and lowering time.

There is no specified upper limit as to the pore volume of the pores having a pore diameter ranging from 0.1 to 0.5 microns and the pores having a pore diameter of more than 0.5 microns, but not more than 10 microns, but it is favorable to keep them not greater than 0.5 ml/g and 0.3 ml/g, respectively, in order to give certain practical compression strength to the carrier and eventually to the catalyst of the invention.

α-(alpha-)alumina may be made by calcining (or firing) an alumina trihydrate such as aluminas produced by electrical fusion, bialite and gibbsite. The catalytic activity to meet the purpose of the invention cannot, however, be obtained by utilizing them as the carrier, since aluminas made as such have, in general, no such structures of pores as specified above.

The catalyst of the invention is suitable for the reforming of lower hydrocarbons such as methane.

There is no specific limitation on the procedure for supporting the nickel component on the porous body of α-(alpha-)alumina. It is only necessary to distribute the active component, nickel, homogeneously into the porous alumina surface area as widely as possible. A well-known procedure of immersing the carrier in a solution of a nickel salt is appropriate.

Active alumina having the aforementioned characteristics is, for instance, immersed in an aqueous solution of nickel nitrate. After the aqueous solution is impregnated into the alumina to reach the center of the porous body, the alumina is dried at ambient temperature and then forced to dry at about 100°–130° C. The so-treated alumina is then further heat-treated (calcined) to give the catalyst of the present invention.

All or a part of the impregnated nickel is converted to $NiAl_2O_4$ (nickel aluminate) by, for example, calcining the force-dried material under an oxidative atmosphere (e.g. air).

The calcining may be carried out by holding it at a temperature ranging favorably from 600 to 1200° C., more favorably 800 to 920° C., and most favorably from 850° to 900° C., to give a catalyst of the invention. The activity of the catalyst decreases when the calcining temperature is higher than this range, whereas the activity of the catalyst, which is high enough initially, is gradually lost along with the time of utilization thereof when the calcining temperature is lower than this range.

A suitable time for the calcination (or calcining or firing) of the carrier impregnated with nickel is from one to ten hours. A longer calcination is favorable when a large amount of nickel is to be carried or when the calcination temperature is lower. Generally, from 4 to 8 hours of firing at from 850 to 950° C. is sufficient to obtain a catalyst of the invention carrying about 8% of nickel in weight, as converted to a nickel oxide basis.

The calcination of the carrier impregnated with nickel is carried out under an oxidative atmosphere represented by air.

Incidentally, this calcination may be accomplished for such carriers carrying nickel which have been insufficiently calcined, at least partially before the application of the catalyst, in the reactor where it is packed and utilized, for instance, if circumstances permit.

The amount of $NiAl_2O_4$ formed is determined as follows. The catalyst is analyzed by X-ray diffraction analysis and the NA ratio is obtained. The NA ratio is defined as a ratio of the peak area of $NiAl_2O_4$ at $2\theta = 65.7°$ to that of $\alpha$-alumina at $2\theta = 37.7°$, wherein a peak area is obtained as the half width multiplied by the height, both being at their peak [(half-width)$\times$-(height)].

The NA ratio of the catalyst of the invention is favorably from about 0.1 to 0.7, and more favorably from about 0.3 to 0.5.

The reduction of the catalyst of the present invention on its application is favorably accomplished at a temperature of from 700° C. to 800° C. and in a stream of methane and steam for eight to forty-eight hours.

If circumstances allow, the reduction on the application in the steam reforming reactor may be reduced to a degree as adopted in conventional catalysts by reducing the catalyst of the present invention in advance of the packing thereof into the reactor.

In the catalyst of the invention, it is felt that far less deactivation of the catalyst due to the deposition of carbon is found than in conventionally available catalysts, even without any addition of an alkali metal element or the like, because the active nickel, which has been converted from nickel oxide or nickel aluminate by reduction before utilization of the catalyst, is homogeneously distributed on a carrier having pores specified as above. The carrier is similar to the carrier of U.S. Ser. No. 07/345 430 containing $NiAl_2O_4$ (nickel aluminate) when the catalyst of the present invention is utilized.

The addition of an alkaline metal element or the like is not necessary for the catalyst of the present invention, but may be allowed to the degree that it does not disadvantageously affect the catalyst.

EXAMPLES

The catalyst of the invention will be illustrated with reference to the following examples, without restricting the invention to these.

EXAMPLE 1

A catalyst of the invention was prepared as follows. Porous body particles of an $\alpha$-(alpha-)alumina of an average particle diameter of 5 mm, in which the pore volume given by the pores of the pore diameter ranging from 0.1 to 0.5 microns was 0.22 ml/g and the pore volume given by the pores of the pore diameter of more than 0.5 microns but not more than 10 microns was 0.07 ml/g, were immersed in 1l of an aqueous solution containing 1.3 kg of nickel nitrate ($Ni(NO_3)_2.6H_2O$), and dried overnight at an ambient temperature. The particles were further dried by heating at 120° C. for six hours, then the temperature was raised to from 850° C. to 900° C. in from five to six hours, and the particles were kept at this temperature for five hours to be calcined.

The catalyst thus obtained contained 8.6% by weight of nickel (value calculated in terms of nickel oxide). The catalyst's NA ratio was 0.46. This catalyst will be hereinafter called "Catalyst A".

A catalyst with the same content of nickel as Catalyst A was obtained in the same way as Catalyst A except that the raising time to the calcining temperature, the temperature and the time of the calcining were five hours, from 560° to 580° C. and ten hours, respectively. This catalyst will be hereinafter called "Catalyst A-1". The NA ratio for Catalyst A-1 was 0.08.

A catalyst with the same content of nickel as Catalyst A was obtained in the same way as Catalyst A except that the raising time to the calcining temperature, the temperature and the time of the calcining were six hours, from 1,200 to 1,250° C. and four hours, respectively. This catalyst will be hereinafter called "Catalyst A-2". The NA ratio for Catalyst A-2 was 1.0.

Further, below mentioned Catalyst B, Catalyst C and Catalyst D were prepared.

Catalyst B

Catalyst B was prepared as follows:

Porous body particles of an $\alpha$-(alpha-)alumina of an average particle diameter of 5 mm, in which the pore volume given by the pores of the pore diameter ranging from 0.1 to 0.5 microns was 0.05 ml/g and the pore volume given by the pores of the pore diameter of more than 0.5 microns but not more than 10 microns was 0.2 ml/g, were made to carry (or impregnated with) 8.6% by weight of nickel (value calculated in terms of nickel oxide), by a similar method as in Catalyst A. The NA ratio was 0.44.

Catalyst C

Catalyst C was prepared as follows:

Porous body particles of an $\alpha$-alumina of an average particle diameter of 5 mm, in which the pore volume given by the pores of the pore diameter ranging from 0.1 to 0.5 microns was 0.21 ml/g and the pore volume given by the pores of the pore diameter of more than 0.5 microns was 0 (zero) ml/g was made to carry 8.6% by weight of nickel (value calculated in terms of nickel oxide), by a similar method as in Catalyst A. The NA ratio was 0.42.

Catalyst D

Catalyst D was prepared as follows. Porous bodies of an $\alpha$-alumina of an average particle diameter of 5 mm, in which the pore volume given by the pores of the pore diameter ranging from 0.1 to 0.5 microns was 0.23 ml/g, the pore volume given by the pores of the pore diameter of more than 0.5 microns but not more than 10 microns was substantially 0 (zero) ml/g and the pore volume given by the pores of the pore diameter of more than 10 microns was 0.06 ml/g, were made to carry 8.6% by weight of nickel (value calculated in terms of nickel oxide) by a similar method as in Catalyst A. The NA ratio was 0.42.

Each of the above catalysts was packed into a reactor tube with an inside diameter of 12.3 mm, then the temperature of the catalyst bed was raised to 800° C., and then each of the catalysts was reduced for twenty hours with steam and methane at a S/C ratio, i.e., a molar steam-to-carbon ratio (carbon contained in or composing methane), of 7.0 and at a space velocity $SVo=1,000$ $h^{-1}$.

Thereafter, each catalyst was utilized for a steam reforming experiment. Methane and steam were fed into the reactor tube under the conditions of $S/C=3.0$, reaction pressure $P=0.2$ $kg/cm^2G$, and $SVo=8,000$ $h^{-1}$.

The reaction product of each experiment was recovered through a cooler to remove water and then sent through a gas meter and analyzed by gas-chromatography. The reaction had been performed continuously for five hundred hours. The results are shown in Table 1. The value 0 (zero) in the reaction time column means the starting point of the reaction which is right after the reduction treatment mentioned above, and "approach temperature" is a difference between the equilibrium temperature calculated from the measured composition of the reaction product and the actually measured temperature in the experiment.

TABLE 1

| Catalyst | Reaction Time (hr) | Reaction Temperature (°C.) | Approach Temperature in Stream Methane Reforming (°C.) | Composition of Reaction Product Gas (vol. %) | | | |
|---|---|---|---|---|---|---|---|
| | | | | $H_2$ | CO | $CO_2$ | $CH_4$ |
| A | 0 | 690 | 23.6 | 75.6 | 13.0 | 9.2 | 2.2 |
| | 500 | 690 | 23.6 | 75.6 | 13.0 | 9.2 | 2.2 |
| A-1 | 0 | 690 | 30.9 | 75.4 | 12.8 | 9.2 | 2.6 |
| | 500 | 690 | 150.0 | 62.0 | 9.9 | 7.6 | 20.5 |
| A-2 | 0 | 690 | 67.2 | 73.3 | 11.5 | 9.7 | 5.5 |
| B | 0 | 690 | 40.7 | 74.0 | 16.5 | 6.1 | 3.4 |
| C | 0 | 690 | 43.4 | 74.9 | 12.2 | 9.5 | 3.4 |
| D | 0 | 690 | 61.9 | 73.9 | 11.1 | 10.2 | 4.9 |

A high catalytic activity was shown by the result with Catalyst A, and substantially no deactivation of the catalyst was observed.

Catalyst A-1 showed a high initial activity followed by a large deactivation.

Catalyst A-2 had somewhat less initial activity. This would be attributed to the lower content of effective nickel due to the conversion of most of the deposited NiO into $NiAl_2O_4$ during calcination.

A low catalytic activity was shown with Catalyst B, presumably due to the reason that it had a pore volume over 0.05 ml/g regarding the pores with diameter more than 0.5 microns but not more than 10 microns but another restriction of the invention was not fulfilled.

With Catalyst C, a large deactivation of the catalyst was observed presumably due to the reason that it had a pore volume of more than 0.2 ml/g with respect to the pores with diameter from 0.1 to 0.5 microns but another restriction of the invention was not fulfilled.

EXAMPLE 2

The n-hexane steam reforming activity of Catalyst A and Catalyst E and their deactivation over time were measured the same as in Example 1.

Catalyst E was prepared as follows. Porous bodies of an o-alumina of an average particle diameter of 5 mm, in which the pore volume given by the pores of the pore diameter ranging from 60 to 120Å (angstroms) was 0.42 ml/g and the pore volume given by the pores of the pore diameter of more than 120Å was 0.13 ml/g was made to carry 8.6% by weight of nickel (value calculated in terms of nickel oxide) by the method used in the preparation of Catalyst A except that the calcining was performed at 500° C. for three hours. The NA ratio was 0 (zero).

The reaction conditions were the same as those of Example 1

The results are illustrated in Table 2.

TABLE 2

| Catalyst | Reaction Time (hr) | Reaction Temperature (C.°) | Composition of Reaction Product Gas (vol. %) | | | |
|---|---|---|---|---|---|---|
| | | | $H_2$ | CO | $CO_2$ | $CH_4$ |
| A | 0 | 700 | 70.6 | 13.5 | 13.7 | 2.2 |
| | 500 | 700 | 70.6 | 13.5 | 13.7 | 2.2 |
| E | 0 | 700 | 70.9 | 14.3 | 13.1 | 1.8 |
| | 500 | 700 | 58.5 | 10.6 | 15.3 | 15.6 |

Both Catalyst A and Catalyst E had a high initial activity. However, Catalyst E had a large deactivation while Catalyst A exhibited a stable catalytic activity.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A catalyst for a steam reforming process comprising a porous aluminum carrier and nickel oxide in which the aluminum oxide carrier has a pore volume of pores having a pore diameter ranging from 0.1 to 0.5 micron of not less than 0.2 ml/g and a pore volume of pores having a pore diameter of more than 0.5 micron but not more than 10 microns of not less than 0.05 ml/g, said porous aluminum oxide carrier having a purity determined upon ignition dryness of not less than 98% by weight and being impregnated with nickel in an amount ranging from 3 to 20% by weight, said % by weight being determined on a nickel oxide basis, based on the total amount by weight of the catalyst, said catalyst being formed by immersing said porous aluminum oxide carrier in a solution containing a nickel compound, drying and then calcining the immersed aluminum oxide carrier.

2. A catalyst as claimed in claim 1, wherein at least a part of said nickel is in the form of $NiAl_2O_4$.

* * * * *

UNITED STATES PATENT AND TRADEMARK OFFICE
CERTIFICATE OF CORRECTION

PATENT NO. : 5 100 857
DATED : March 31, 1992
INVENTOR(S) : Nobuhiro SATO et al

It is certified that error appears in the above-identified patent and that said Letters Patent is hereby corrected as shown below:

On title page at item [57], line 5; delete "a".

Column 6, line 43; between "aluminum" and "carrier" insert ---oxide---.

Signed and Sealed this

Third Day of August, 1993

Attest:

MICHAEL K. KIRK

Attesting Officer

Acting Commissioner of Patents and Trademarks